United States Patent [19]

Linne et al.

[11] Patent Number: 5,018,152
[45] Date of Patent: May 21, 1991

[54] APPARATUS FOR CONTROLLING PULSE ENERGY IN A Q-SWITCHED LASER SYSTEM

[75] Inventors: Mark A. Linne, Mountain View; Robert W. Johnson, Los Altos; Richard G. Thompson, Scotts Valley, all of Calif.

[73] Assignee: Spectra-Physics, Inc., San Jose, Calif.

[21] Appl. No.: 404,316

[22] Filed: Sep. 7, 1989

[51] Int. Cl.[5] .............................................. H01S 3/10
[52] U.S. Cl. ..................................................... 372/25
[58] Field of Search ......................... 372/25, 38, 71, 75

[56] References Cited

U.S. PATENT DOCUMENTS

| | | | |
|---|---|---|---|
| 4,688,884 | 8/1987 | Scifres et al. | 350/96.15 |
| 4,713,819 | 12/1987 | Yoshikawa | 372/38 |
| 4,763,975 | 8/1988 | Scifres et al. | 350/96.15 |
| 4,768,198 | 8/1988 | Deki | 372/25 |
| 4,818,062 | 4/1989 | Scifres et al. | 350/96.29 |
| 4,820,010 | 4/1989 | Scifres et al. | 350/96.15 |
| 4,856,012 | 8/1989 | Takenaka | 372/25 |

FOREIGN PATENT DOCUMENTS 0020386  1/1987  Japan ..................................... 372/25

OTHER PUBLICATIONS

Spectra Physics, "Fiber Coupled Series Diode Pumped, Q-Switched Solid State Laser System", Dec. 1988.

Primary Examiner—William L. Sikes
Assistant Examiner—Robert E. Wise
Attorney, Agent, or Firm—Fliesler, Dubb, Meyer & Lovejoy

[57] ABSTRACT

A switched cavity laser system which includes a resonant cavity, a gain medium within the resonant cavity, a cavity switch and an output coupler. A controllable pump energy source delivers pump energy to the gain medium in response to an energy control signal. A detector is coupled with the gain medium and generates a detector signal in response to the amount of population inversion exhibited by the gain medium. A control circuit is coupled to the detector and controllable pump energy source for generating the energy control signal in response to the detector signal. As the switching rate of the Q-switch is varied, the energy control signal varies to ensure a constant level of population inversion between each pulse. In this matter, a prespecified pulse energy is achieved for each pulse independent of the switching rate of the Q-switch.

15 Claims, 3 Drawing Sheets

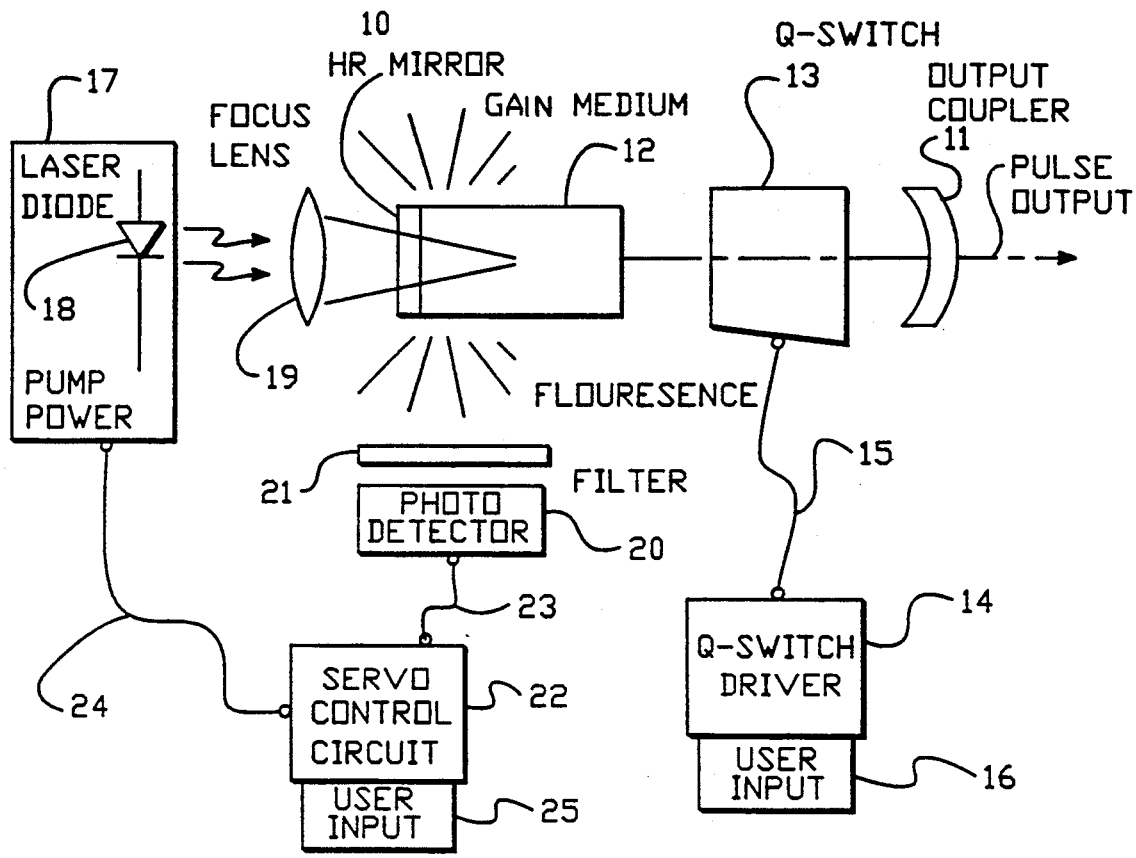
FIG.−1
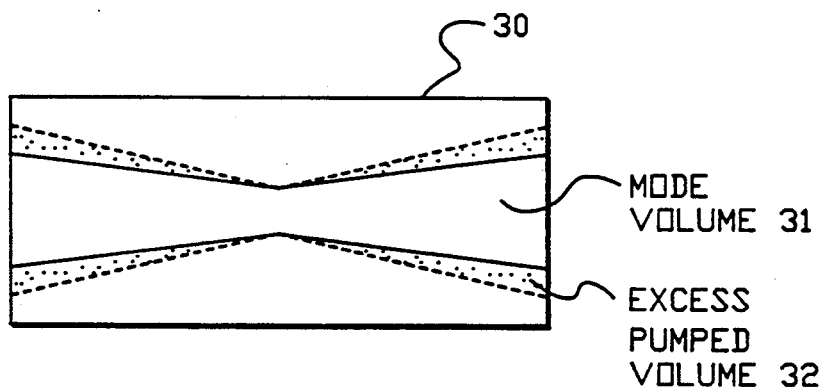
FIG.−2

APPARATUS FOR CONTROLLING PULSE ENERGY IN A Q-SWITCHED LASER SYSTEM

FIELD OF THE INVENTION

The present invention relates to systems for controlling pulse energy in Q-switched lasers.

DESCRIPTION OF RELATED ART

Switched cavity laser systems include a gain medium and a Q-switch disposed in a resonant cavity. The gain medium is pumped continuously while the Q-switch operates to switch the Q of the cavity at a selected switching rate. The Q-switch switches the Q of the cavity between a high value which supports lasing action within the resonant cavity, and a low value which, in effect, turns off the resonant cavity. While the resonant cavity is turned off, the pumping energy builds a population inversion inside the gain medium. When the Q-switch turns on the resonant cavity, the built up population inversion is rapidly swept out by the laser action, resulting in a large pulse of laser energy. A detailed description of laser Q-switching is found in Siegman, LASERS, University Science Books (1986), pp. 1004–1040.

The amount of population inversion buildup between pulses in a switched cavity laser system directly determines the energy content of the output pulse. The build up reaches an equilibrium for a given medium and pump energy level, where isotropic fluorescence losses balance off the pump energy.

In prior art switched cavity laser systems, the gain medium has been continuously pumped at a relatively constant pump energy. Thus, for higher switching rates, the energy content of resulting pulses begins to roll off because the time required for the gain medium to reach equilibrium at the constant pump energy becomes longer than the period between pulses. See, Koechner, SOLID STATE LASER ENGINEERING, Second Edition, Springer-Verlag, 1988, pp. 408–412, for a theoretical discussion of the energy content versus pulse switching rate of a Q-switched laser system.

For many applications of switched cavity laser systems, such as micro-machining, semiconductor fabrication processes, and other cutting and drilling applications, it is desirable to generate pulses with a controlled energy content. In addition, it is desirable to be able to maintain a controlled energy content for a wide range of switching rates of output pulses.

SUMMARY OF THE INVENTION

The present invention provides an apparatus for controlling pulse energy in a switched cavity laser system which includes a resonant cavity, a gain medium within the resonant cavity, a cavity switch and an output coupler. The invention includes a controllable pump energy source, for delivering pump energy to the gain medium in response to an energy control signal. A detector is coupled with the gain medium and generates a detector signal in response to the amount of population inversion exhibited by the gain medium. A control circuit is coupled to the detector and controllable pump energy source for generating the energy control signal in response to the detector signal.

According to one aspect, the present invention is a diode pumped Q-switched solid state laser system, with a photodetector coupled with the gain medium. The photodetector generates an output signal indicating the amount of fluorescence of the gain medium. The amount of fluorescence indicates the amount of population inversion in the gain medium. The output of the photodetector is coupled to a servo control circuit for controlling the laser diode output power.

According to another aspect, the present invention is a switched cavity laser system for generating pulses of coherent radiation. The system includes a resonant cavity, having an output coupler. A Q-switch within the resonant cavity switches the cavity at a variable switching rate. The gain medium within the cavity undergoes population inversion in the presence of pump energy. A controllable pump energy source delivers energy to the gain medium, wherein the pump energy has a magnitude controlled in response to an energy control signal. A detector coupled with the gain medium generates a detector signal in response to a characteristic of the gain medium which indicates the amount of population inversion. The energy control signal is generated by a control circuit in response to the detector signal and to a prespecified pulse energy. As the switching rate of the Q-switch is varied, the energy control signal varies to ensure a constant level of population inversion between each pulse. In this manner, a prespecified pulse energy is achieved for each pulse independent of the switching rate of the Q-switch.

The gain medium has a mode volume which exhibits fluorescence, and an area outside the mode volume which is pumped by the pump energy and also exhibits fluorescence. When the Q-switch opens the cavity, the mode volume is swept out so that effectively no fluorescence occurs from within the mode volume. However, the area outside the mode volume exhibiting fluorescence remains energized. Thus, the control circuit for generating the energy control signal includes means for compensating for the fluorescence generated outside the mode volume.

Further aspects and advantages of the present invention will be found upon review of the drawings, the detailed description and the claims which follow.

BRIEF DESCRIPTION OF THE FIGURES

FIG. 1 is a block diagram of a sWitched cavity laser system, according to the present invention.

FIG. 2 is a schematic diagram illustrating the mode volume and the excess pumped volume within the gain medium.

DETAILED DESCRIPTION

Figure 3:
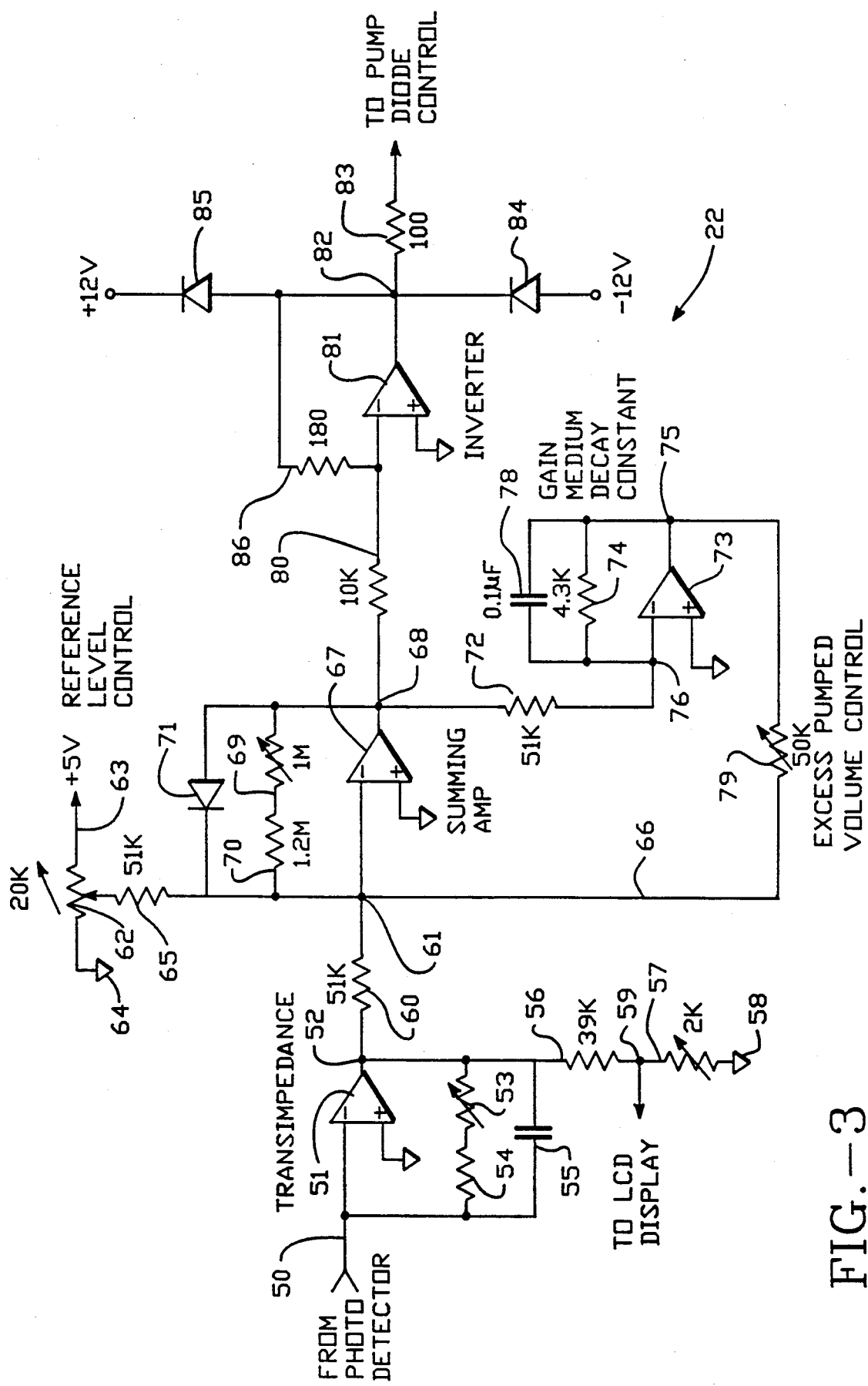
FIG. 3 is a schematic diagram of a servo control circuit, according to the present invention.

A detailed description of a preferred embodiment of the present invention is provided with reference to FIGS. 1–6.

FIG. 1 is a schematic diagram of a switched cavity laser system, according to the present invention. The laser system includes a resonant cavity formed by high reflecting mirror 10 and output coupler 11. A gain medium 12 and a Q-switch 13 are disposed within the resonant cavity. A Q-switch driver 14 is coupled across line 15 to the Q-switch 13. The Q-switch driver 14 has a variable repetition rate which can be set by user input device 16.

A controllable pump energy source 17, including laser diode 18, is coupled with the gain medium 12 through focusing lens 19. The laser diode 18 generates radiation which causes a population inversion within the gain medium 12 to drive the laser.

A photodetector 20 is coupled with the gain medium 12 to detect fluorescence from the gain medium 12 which indicates the amount of population inversion in the gain medium. A filter 21 is mounted between the photodetector 20 and gain medium 12 to filter radiation at the laser diode wavelength from affecting the fluorescence detection at the photodetector 20.

A servo control circuit 22 is coupled to the photodetector across line 23 and to the controllable energy source 17 across line 24. The servo control circuit 22 can be operated by a user through user input 25 to set a prespecified pulse energy for the switched cavity laser system.

This system has been implemented using a modified Spectra-Physics model 7950 Q-switched laser head, model 7250 Q-switch driver, and model 7200 laser diode module. (Spectra-Physics, 1250 W. Middlefield Road, Mountain View, Calif. 94039-7013). The photodetector 20 and servo control circuit 22 are added to implement the control loop, according to the present invention.

In the system based on the model 7950, the laser diode generates pumping radiation at approximately 800 nanometers. The filter 21 is implemented using an RG 850 filter which blocks the pump radiation. The gain medium 12 is Nd:YLF.

It will be appreciated by those skilled in the art that a variety of other types of gain medium and pump energy sources, could be utilized, according to the present invention. Likewise, a variety of Q-switching methods could be used.

In the tested system, the pump energy caused a population inversion to be generated in an area greater than the mode volume, as illustrated in FIG. 2. In FIG. 2, the gain medium is schematically illustrated at 30. The mode volume 31 is the volume in which the laser action occurs and sweeps out the built up energy in the gain medium 30, when the Q-switch turns on the cavity. However, the population inversion builds up in an excess pumped volume 32 which is outside the mode volume 31. This built up energy is not swept out when the cavity is turned on. This excess pumped volume 32 will exhibit fluorescence for a period of time after the pulse is generated. The time that it takes for the fluorescence to decay depends upon the material chosen. In Nd:YLF, the fluorescence decay time constant $\tau$ is approximately 430 microseconds. For Nd:YAG, the fluorescence decay time constant $\tau$ is approximately 280 microseconds.

Therefore, in a system monitoring the fluorescence as an indicator of the amount of population inversion in the gain medium, the control circuitry must compensate for fluorescence generated in the excess pumped volume, and for other sources of noise in the detected characteristic of the gain medium.

A schematic diagram of the servo control circuit, according to the present invention, is illustrated in FIG. 3. This circuit compensates for the excess pump volume and provides for constant energy content for Q-switched pulses.

An input signal from the photodetector is supplied on line 50. The signal is supplied through the transimpedance OP amp 51, which translates the current on line 50 to a voltage level at node 52. The OP amp 51 is connected with feedback resistors 53 and 54 coupled from line 50 to node 52. Also, a snubbing capacitor 55 is coupled from node 52 to line 50. Node 52 is coupled through resistor 56 and potentiometer 57 to ground 58. The terminal 59 between resistor 56 and potentiometer 57 is connected to a liquid crystal display (not shown).

The signal on line 52 is supplied through resistor 60 to summing node 61. A second signal coupled to summing node 61 is the reference level control signal generated by potentiometer 62 which is coupled from a five volt source 63 to ground 64. Resistor 65 is coupled from the tap on the potentiometer 62 to node 61. This sets an energy content level for pulses to be generated by the Q-switch laser system. The potentiometer is a user input device schematically illustrated at 25 in FIG. 1.

The third input at summing node 61 is supplied through the network for compensating for the excess pumped volume, which supplies a control signal on line 66.

The summing amplifier 67 generates an output at node 68. The output at node 68 is coupled through potentiometer 69 and resistor 70 to the input node 61. These resistors set the gain of the summing amplifier 67. Diode 71 is coupled from node 68 to node 61 to prevent positive signals, which could cause look up.

Node 68 is also coupled through resistor 72 to OP amp 73. OP amp 73 is connected with a feedback circuit establishing a gain medium decay constant. The feedback circuit includes resistor 74 coupled from the output at 75 of OP amp 73 to the input at 76 of OP amp 73. Also, capacitor 78 is coupled from node 75 to node 76. For a Nd:YLF laser host, the decay constant $\tau$ is approximately 430 microseconds. Thus, for a servo control circuit operating with a Nd:YLF system, the value of the capacitor 78 and resistor 74 should establish a similar time constant. For instance, as shown in the FIG. 3, a 4.3 Kohm resistor and a 0.1 microFarad capacitor establish the appropriate time constant.

The output of the OP amp 75 is coupled through potentiometer 79, across line 66, to the summing node 61. By adjusting the potentiometer 79, the system can be controlled to match and compensate for the excess pump volume within the gain medium.

The output of the summing amp 68 is coupled through resistor 80 to an output inverter 81. The output inverter 81 generates an output on line 82 which is coupled through resistor 83 as an energy control signal to the pump diode control.

Diodes 84 and 85 provide maximum power limits for the servo control circuit Resistor 86 establishes a gain for the inverting amp 81.

The values shown for resistors and capacitors in the circuit of FIG. 3 are meant to be illustrative of a tested embodiment. These values should be optimized for a particular application.

Figure 4:
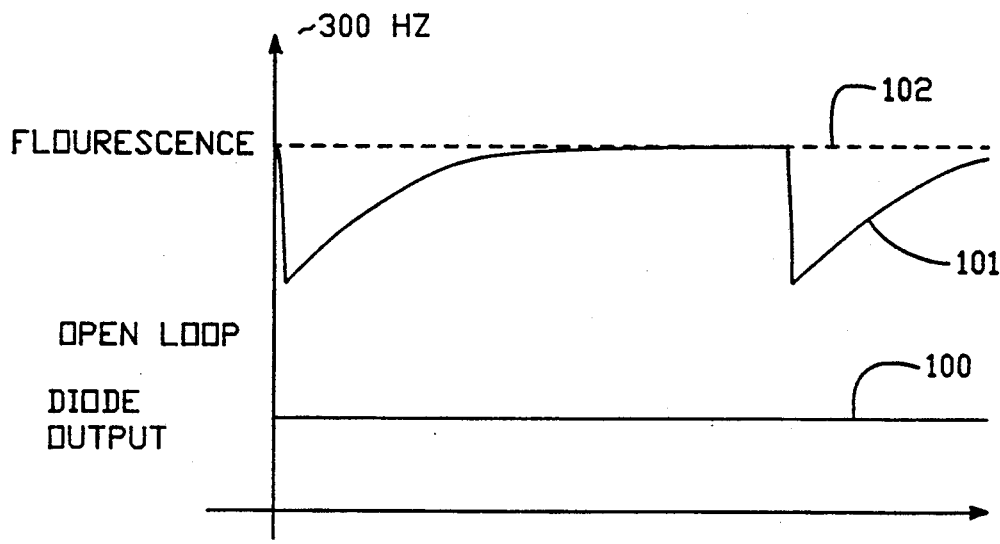
FIG. 4 is a graph illustrating pump output power and fluorescence for a switched cavity laser system operated at a repetition rate of 300 Hertz with a constant pump output power.

FIG. 4 is a graph illustrating the output of the photodetector and the output power of the laser diode for the system of FIG. 1 operated open loop. In this system, with a constant diode output as illustrated at trace 100, and the Q-switch operating at approximately 300 Hertz, the fluorescence exhibits a trace as shown at 101. Fluorescence trace drops sharply when the Q-switch turns the cavity on and slowly builds up to an equilibrium level shown at line 102. As long as the period between Q-switch pulses is long enough for the population inversion to build up sufficiently to generate a fluorescence output at level 102, the pulse energy content will be constant. However, it can be seen that using a constant diode output, the energy will not have sufficient time to build up to a constant level at frequencies above about 1,000 Hertz for the parameters illustrated at FIG. 4.

Figure 5:
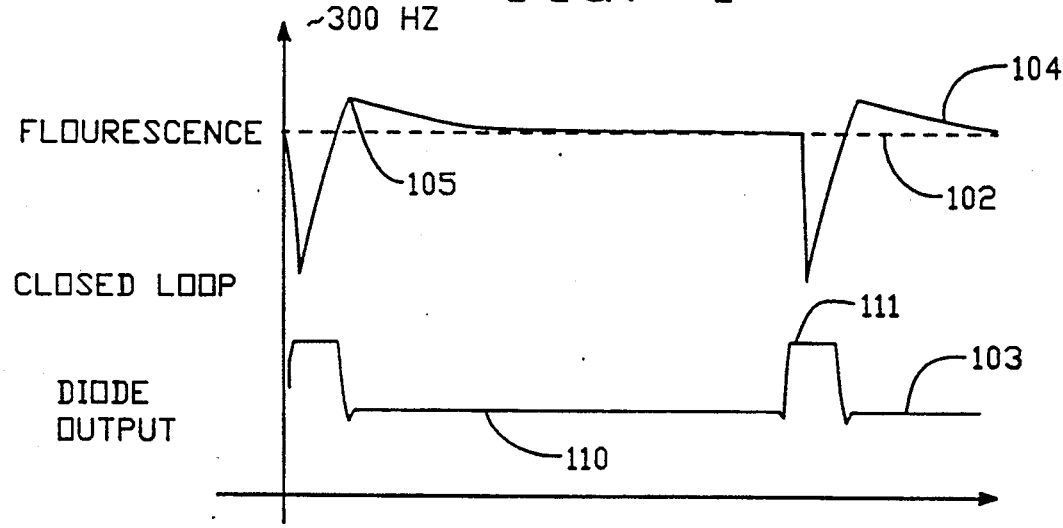
FIG. 5 is a graph showing pump output power and fluorescence of a gain medium for the system illustrated in FIG. 1, operated at approximately 300 Hertz and generating a prespecified pulse energy.

Operating the present invention close loop as shown in FIG. 5, it can be seen that the diode output shown at trace 103 increases sharply when the Q-switch turns on the cavity and rises to a maximum level. It remains at the maximum level until the fluorescence shown at trace 104 reaches a peak at point 105. Then the diode output drops sharply to a constant level. Because of the excess pumped volume control in the servo circuit, this peak 105 is over the preset equilibrium level 102. However, this merely reflects the excess pump volume. The fluorescence within the mode volume in the gain medium will reach the preset level 102 at about point 105. Then, the fluorescence level decays at a rate determined by the fluorescence decay time constant down to the equilibrium level 102. When the Q-switch turns on the cavity again, a pulse with a controlled energy content is generated.

Figure 6:
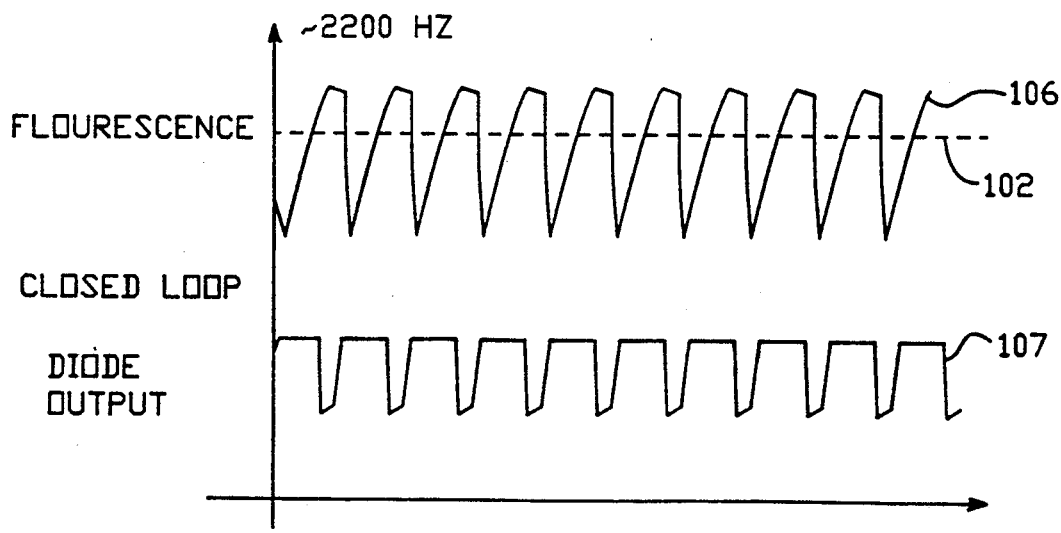
FIG. 6 is a graph illustrating the pump output power and the fluorescence for the system of FIG. 1, operated at approximately 2,200 Hertz.

The effects of this servo control are more dramatically illustrated in FIG. 6 where the Q-switch is operated at approximately 2,200 Hertz, it generates an output pulse with the same energy content as generated at 300 Hertz.

In this system, it can be seen that the pump diode output shown at trace 107 rises sharply when a Q-switch turns on a cavity, remains high until the peak energy is reached, and drops sharply. Shortly after, at this switching rate, the Q-switch will be turned on again, causing the diode pump power to rise sharply. The fluorescence trace at 106 illustrates that the peak fluorescence rises above the preset equilibrium level 102 and never reaches that level before the Q-switch turns on the cavity for the next pulse. However, the excess mode volume accounts for this excess fluorescence.

Analytically, FIG. 5 shows diode output at trace 103 having a base level along line 110 and a peak level at point 111. The base level determines a preset value 102 of the population inversion which can be maintained by the system. It can be termed equivalent CW pump energy for a given energy content in the output pulses.

Experiments were conducted using the circuit of FIG. 3. For a base level of 155 milliwatts laser diode output, pulse energy content of approximately 18 microjoules was held constant over a range from less than 10 Hertz out to 3.1 KiloHertz. With a base pump energy of 185 milliwatts, pulse energy content of about 23 microjoules was held constant out to over 2,000 Hertz.

The peak diode output is established by the pump energy supply and the type of pump energy source. Using a pump energy source which has a wider range of control over pump energy output, a more precise control of the output of the Q-switch laser system could be achieved. In such a system, the servo loop could drive a pump energy output with a output trace which matches the fluorescence trace precisely, instead of having the clipped output as shown in FIGS. 5 and 6.

In addition to establishing constant energy content for Q-switch laser systems operating at variable frequencies, the servo control circuit, according to the present invention, can be used to compensate for variations in a pump energy supplied to the gain medium. By monitoring the fluorescence level, the efficiency and amount of energy being coupled into the gain medium is detected. As the diode output power drifts, or suffers other sources or types of noise, the control circuit can detect and compensate for such drift or noise.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An apparatus for controlling pulse energy in a switched cavity laser system including a resonant cavity, a gain medium within the cavity, a cavity switch, means for generating pump energy and an output coupler, wherein the gain medium exhibits fluorescence in response to pump energy, comprising:

controllable means, coupled with the means for generating pump energy and the gain medium, for controlling the pump energy delivered to the gain medium in response to an energy control signal;

detector means, coupled with the gain medium, for generating a fluorescence signal in response to the fluorescence exhibited by the gain medium; and means, connected to the detector means and the controllable means, for generating the energy control signal in response to the fluorescence signal.

2. The apparatus of claim 1, wherein the gain medium has a mode volume which exhibits the fluorescence, and an area outside of the mode volume which exhibits the fluorescence, and the means for generating the energy control signal includes:

means for compensating for the fluorescence exhibited by the area outside of the mode volume.

3. The apparatus of claim 2, wherein the gain medium has a fluorescence decay time constant, and the means for compensating has a matching decay time constant.

4. An apparatus for controlling pulse energy in a switched cavity laser system including a resonant cavity, a gain medium within the cavity, a cavity switch, means for generating pump energy and an output coupler, wherein the gain medium exhibits population inversion in response to pump energy, comprising:

controllable means, coupled with the means for generating pump energy and the gain medium, for controlling the pump energy delivered to the gain medium in response to an energy control signal;

detector means, coupled with the gain medium, for generating a detector signal in response to the population inversion exhibited by the gain medium; and means, connected to the detector means and the controllable means, for generating the energy control signal in response to the detector signal.

5. The apparatus of claim 4, wherein the detector means comprises means, mounted with the gain medium, for detecting fluorescence of the gain medium.

6. The apparatus of claim 5, wherein the gain medium has a mode volume which exhibits the fluorescence, and an area outside of the mode volume which exhibits the fluorescence, and the means for generating the energy control signal includes:
means for compensating for the fluorescence exhibited by the area outside of the mode volume.

7. The apparatus of claim 6, wherein the gain medium has a fluorescence decay time constant, and the means for compensating has a matching decay time constant.

8. The apparatus of claim 4, wherein the controllable means includes:
means for generating electrical power, the power having a magnitude controlled in response to the energy control signal; and the means for generating pump energy includes
means, coupled with the means for generating electrical power, for converting the electrical power to the pump energy.

9. The apparatus of claim 8, wherein the means for converting comprises a laser diode.

10. A switched cavity laser system for generating pulses of coherent radiation, comprising:
a resonant cavity, including an output coupler;
means, within the resonant cavity, for switching the cavity at a variable switching rate;
a gain medium within the cavity, wherein the gain medium exhibits population inversion in the response to pump energy;
means for generating pump energy;
controllable means, coupled with the means for generating pump energy and the gain medium, for controlling the pump energy delivered to the gain medium in response to an energy control signal;
detector means, coupled with the gain medium, for generating a detector signal in response to the population inversion exhibited by the gain medium; and
means, connected to the detector means and the controllable means, for generating the energy control signal in response to the detector signal and a prespecified pulse energy.

11. The apparatus of claim 10, wherein the detector means comprises means, mounted with the gain medium, for detecting fluorescence of the gain medium.

12. The apparatus of claim 11, wherein the gain medium has a mode volume which exhibits the fluorescence, and an area outside of the mode volume which exhibits the fluorescence, and the means for generating the energy control signal includes:
means for compensating for the fluorescence exhibited by the area outside of the mode volume.

13. The apparatus of claim 12, wherein the gain medium has a fluorescence decay time constant, and the means for compensating has a matching decay time constant.

14. The apparatus of claim 10, wherein the controllable means includes:
means for generating electrical power, the power having a magnitude controlled in response to the energy control signal; and the means for generating pump energy includes
means, coupled with the controllable means, for converting the electrical power to the pump energy.

15. The apparatus of claim 14, wherein the means for converting comprises a laser diode.

* * * * *